United States Patent
Mohanta et al.

(10) Patent No.: US 10,498,809 B2
(45) Date of Patent: Dec. 3, 2019

(54) SELECTIONS OF MANAGING NODES IN CLUSTERS OF NODES

(71) Applicant: Hewlett Packard Enterprise Development LP, Houston, TX (US)

(72) Inventors: Taranisen Mohanta, Bangalore (IN); Abhijith Umesh, Bangalore (IN); Lakshya Garg, Bangalore (IN); Nilesh Anant Salvi, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 125 days.

(21) Appl. No.: 15/882,566

(22) Filed: Jan. 29, 2018

(65) Prior Publication Data

US 2019/0238634 A1   Aug. 1, 2019

(51) Int. Cl.
  *H04L 29/08*   (2006.01)
  *H04L 12/26*   (2006.01)
  *G06F 11/14*   (2006.01)
  *H04L 12/715*  (2013.01)
  *H04W 40/32*   (2009.01)
  *G06F 16/23*   (2019.01)

(52) U.S. Cl.
  CPC ...... *H04L 67/1051* (2013.01); *G06F 11/1425* (2013.01); *G06F 16/2365* (2019.01); *H04L 43/0876* (2013.01); *H04L 43/10* (2013.01); *H04L 45/46* (2013.01); *H04L 67/1057* (2013.01); *H04W 40/32* (2013.01); *H04L 67/1029* (2013.01)

(58) Field of Classification Search
  CPC ............ G06F 11/1425; G06F 16/2365; G06F 16/1844; G06F 16/27; G06F 16/182; H04L 45/46; H04L 43/0876; H04W 40/32
  See application file for complete search history.

(56) References Cited

U.S. PATENT DOCUMENTS

| | | | |
|---|---|---|---|
| 6,279,032 B1 | 8/2001 | Short et al. | |
| 8,055,735 B2 * | 11/2011 | Krishnappa | G06F 15/16 709/220 |
| 9,330,158 B1 | 5/2016 | Xiao et al. | |
| 9,699,017 B1 | 7/2017 | Gupta et al. | |

(Continued)

OTHER PUBLICATIONS

Artyom Sharov et al., "Take Me to Your Leader! Online Optimization of Distributed Storage Configurations," Proceedings of the VLDB Endowment, 2015, pp. 1-12, vol. 8, No. 12.

*Primary Examiner* — Chirag R Patel
(74) *Attorney, Agent, or Firm* — Tong, Rea, Bentley & Kim, LLC

(57) ABSTRACT

Example implementations relate to clusters of nodes. In an example, a method includes computing a score for a first node in a distributed storage system comprising a plurality of nodes. The score is a function of at least one of: a location of the first node, a health status of the first node, and a resource utilization of the first node. A rank of the first node among the plurality of nodes is then determined based on the score and on a plurality of scores associated with the plurality of nodes. An instruction is sent to the first node to instantiate a manager process for managing the distributed storage system on the first node when the rank of the first node is at least equal to a predefined rank.

20 Claims, 4 Drawing Sheets

(56) References Cited

U.S. PATENT DOCUMENTS

2014/0075002 A1\* 3/2014 Pradhan ............ G06Q 30/0255
  709/223
2017/0052707 A1   2/2017 Koppolu et al.
2017/0123945 A1\* 5/2017 Panasko ............ G06F 11/2094

\* cited by examiner

SELECTIONS OF MANAGING NODES IN CLUSTERS OF NODES

BACKGROUND

Computer clusters are sets of connected computing devices, or nodes, which work together as a single system. A computer cluster may include a base node, and can be easily scaled by adding one or more additional nodes to create a cluster of shared compute and storage resources. A cluster of nodes can provide improved performance, fault tolerance, and load balancing. In this case, each node may perform one or more of the primary functions of the cluster (e.g., storing and serving data, producing and consuming data streams, and the like).

DETAILED DESCRIPTION

Figure 1:
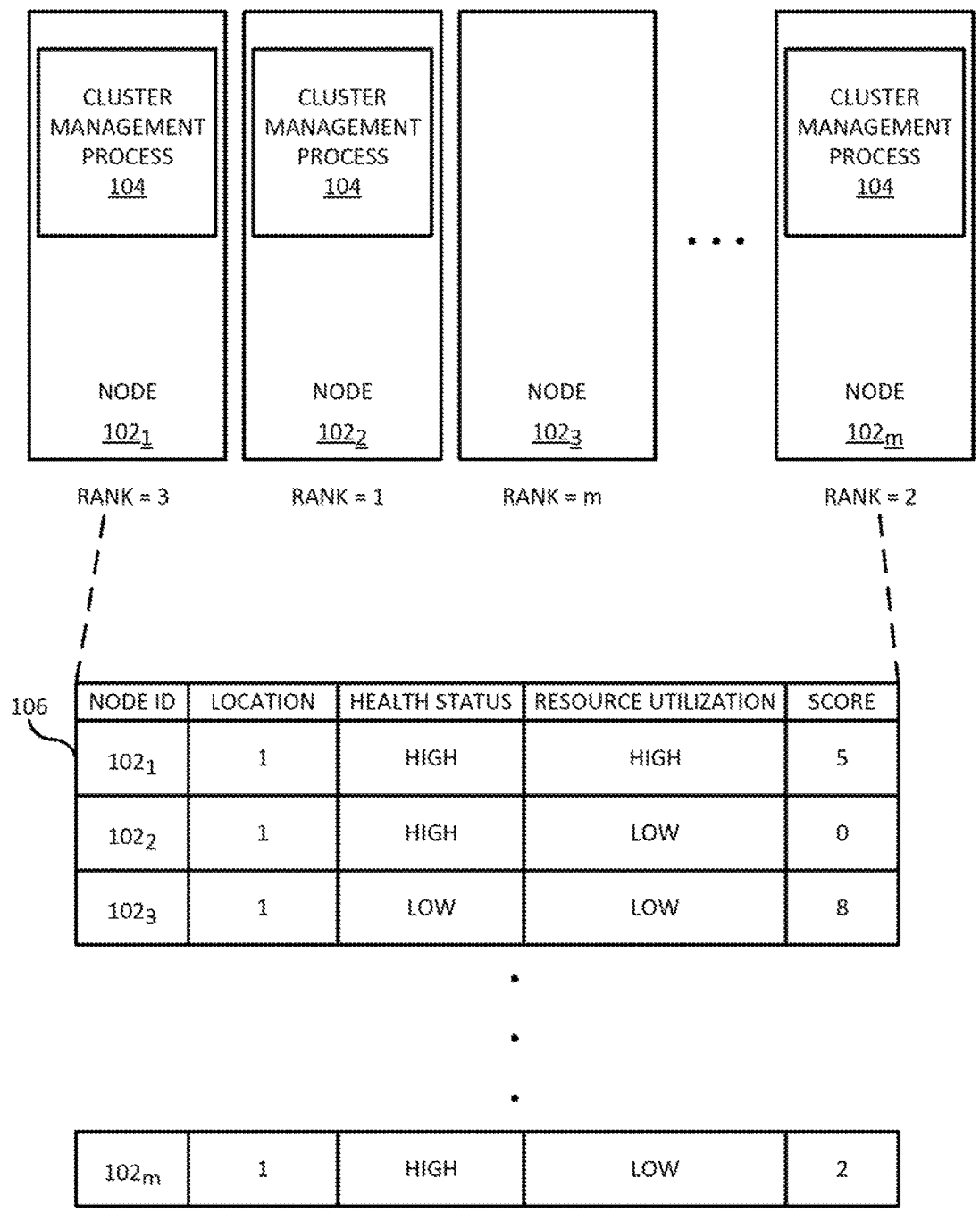
FIG. 1 illustrates a block diagram of an example distributed system of the present disclosure.

The present disclosure describes an apparatus, method, and non-transitory computer-readable medium for selecting managing nodes for a cluster. As discussed above, running multiple nodes as a distributed system or a "cluster" can provide a number of benefits, including scalability, improved performance, fault tolerance, and load balancing.

However, if multiple nodes in the cluster fail simultaneously, the availability of data stored in the cluster can still be negatively affected. Thus, a cluster may adopt a quorum configuration in which data availability is ensured as long as a minimum number (i.e., a quorum) of nodes running a cluster management process—referred to herein as "managing nodes"—remain operational. Conventionally, the selection of managing nodes in a quorum has been based on seniority (i.e., the first x nodes to join the cluster after configuration or boot up are designated as managing nodes). Seniority-based selection processes, however, do not account for differences in node attributes, performance, or other characteristics that may affect cluster or quorum performance.

Examples of the present disclosure provide intelligent selection of managing nodes in a cluster based on node attributes. The cluster will continue to run as long as a quorum of the cluster's managing nodes continues to function. In other words, the data stored in the cluster remains available in the cluster as long as a minimum number of the managing nodes remain functioning.

When a new cluster of nodes is launched, the managing nodes for the new cluster may be selected by any process (e.g., arbitrarily, first x nodes to join after launch, etc.). Each of the managing nodes will then run a cluster management process that, among other functions, selects the managing nodes for the cluster. After the passage of a predefined period of time, on-demand, or in response to a predefined event (e.g., restart of the cluster, departure of managing node from the cluster, addition of new node to the cluster, node failure is predicted in the cluster, a new virtual machine (VM) is created, etc.), the cluster management process will re-evaluate the selection of the managing nodes and potentially replace one or more existing managing nodes with new managing nodes. The selection of the new managing node(s) takes into account node attributes such as geographic location (e.g., site, data center zone, rack, etc.), node health (e.g., stability), node resource utilization (e.g., memory utilization, CPU utilization, disk utilization, bandwidth utilization, etc.), and the like in order to identify the nodes that are best suited to serve as managing nodes (i.e., to increase the likelihood of maintaining the quorum and thus increase the likelihood of maintaining data availability). In other words, the managing nodes may be the nodes that are determined, based on analysis of the node attributes, to be the most stable (e.g., the least likely to fail). Selecting the nodes that are most stable to serve as managing nodes may also minimize the amount of messaging involved in and minimize the processing load associated with consensus decisions.

FIG. 1 illustrates a block diagram of an example distributed system 100 of the present disclosure. The system 100 comprises a cluster, i.e., a plurality of nodes $102_1$-$102_m$ (hereinafter individually referred to as a "node 102" or collectively referred to as "nodes 102"). The nodes 102 may reside at a single site or may be geographically distributed across a plurality of sites. Each site may include one or more racks across which its nodes are distributed. In one example, data is striped across the nodes 102, i.e., such that sequential data (e.g., a file) is segmented logically, and consecutive segments of the data are stored on different nodes. In another example, where striping is not supported, the data may reside on a single node 102 of the cluster (i.e., a "replica"). In one example, one or more of the nodes 102 may comprise a hyperconverged node, i.e., a device in which various information technology resources, such as compute, storage, networking, and virtualization resources, are tightly integrated in a single, software-driven appliance.

In one example, the plurality of nodes 102 is ranked. A node's rank may be determined based on a score calculated for each node 102 that is a function of the node's attributes such as location, health, resource utilization, and the like, as illustrated by the table 106. Each of these attributes may be quantified in some way (e.g., where an indication of "high," "low," "exceeded," "not exceeded," or the like for an attribute could correspond to some numerical value on a scale of values). In addition, it should be noted that the table illustrated in FIG. 1 is simplified. For instance, the attributes of "health status" could be broken into a plurality of more specific attributes such as "stability," "number of reboots," "self monitoring, analysis, an reporting technology (SMART) status," or the like. Within the context of the present disclosures, SMART status refers to the status indicated by a monitoring system that may be included (e.g., in the hard disk drive and/or solid state drive) in a computing device. This monitoring system may detect and report on various indicators of drive reliability, so that hardware failures may be anticipated before they occur. Similarly, the attribute of "resource utilization" could be broken into a plurality of more specific attributes such as "memory utilization," "CPU utilization," "network bandwidth," "disk utilization," and the like. Moreover, additional attributes not falling into the categories of "location," "health status," and "resource utilization" could be accounted for in the score.

In one example, the score represents a Euclidean distance of the node 102 from an "ideal" node. For instance, the score could be calculated, for each node, as the square root of:

$$\text{(SMART status} - 5)^2 + \text{(network bandwidth} - 2)^2 + \text{(CPU utilization} - 2)^2 + \text{(number of reboots} - 2)^2 + \text{(memory utilization} - 2)^2 + \text{(disk utilization} - 3)^2 \quad \text{(EQN. 1)}$$

Once a score has been calculated for each of the nodes 102 in the system 100, the nodes 102 can be ranked as discussed above. Depending on the manner in which the score was calculated, the nodes 102 may be ranked in order of ascending score, in order of descending score, or in another manner. For instance, if the score represents a Euclidean distance to an ideal node, then the nodes may be ranked in order of ascending score, where a lower score indicates that a corresponding node is "closer" to the ideal node (and, thus, lower scores are ranked more highly than higher scores). Example rankings are indicated in FIG. 1 based on the example scores shown in the table 106. For instance, node $102_1$'s rank is 3, node $102_2$'s rank is 1, node $102_3$'s rank is m, and node $102_m$'s rank is 2.

Once the nodes 102 have been ranked, the plurality of nodes 102 may be split into two groups: a first group of managing nodes (at least nodes $102_1$, $102_2$, and $102_m$ in FIG. 1) and a second group of non-managing nodes (at least node $102_3$ in FIG. 1). Those nodes falling into the first group (i.e., managing nodes) will instantiate or run a cluster management process 104 that performs various cluster management operations, including voting to commit state changes to the data stored in the cluster, participating in consensus decisions, resolving network splits and data ownership issues, and selecting managing nodes for the cluster as discussed in greater detail in connection with FIGS. 2 and 3. Those nodes falling into the second group (i.e., non-managing nodes) will participate in the cluster without instantiating or running the cluster management process.

In one example, the plurality of nodes 102 is split into the two groups by determining a number n of desired managing nodes and selecting n of the nodes 102 for inclusion in the first group. In one example, the n selected nodes 102 may comprise the n most highly ranked nodes. In another example, replica nodes are first selected for inclusion in the first group. Then, if the first group does not yet total n nodes, an additional number of the most highly ranked nodes 102 may be selected until the first group totals n nodes. However, replica nodes may be given a greater number of votes for the purposes of voting to commit state changes than non-replica nodes. In one example, the desired number n of managing nodes is an odd number, so as to avoid voting to a tie in the event of the system 100 being partitioned or failure of a managing node. In one example, desired number n of managing nodes is calculated as:

$$\frac{\text{total number of nodes in cluster}}{2} + 1 \quad \text{(EQN. 2)}$$

Thus, in one example, n is at least three. In another example, n is at least five. The desired number n of managing nodes for the cluster 100 may change over time as the topology of the cluster 100 changes (e.g., due to nodes 102 leaving and/or joining the cluster 100, due to the cluster 100 being partitioned, etc.).

The second group, i.e., the group of non-managing nodes, will include at least one node of the plurality of nodes 102. Non-managing nodes in the second group may not instantiate the cluster management process 104. Thus, non-managing nodes may not get to vote to commit state changes or to select managing nodes for the cluster. However, as conditions change within the system 100, a node that was previously designated as a non-managing node may later be selected as a managing node upon recalculation of the scores. Conversely, a node that was previously selected as a managing node may later be designated as a non-managing node upon recalculation of the scores.

Figure 2:
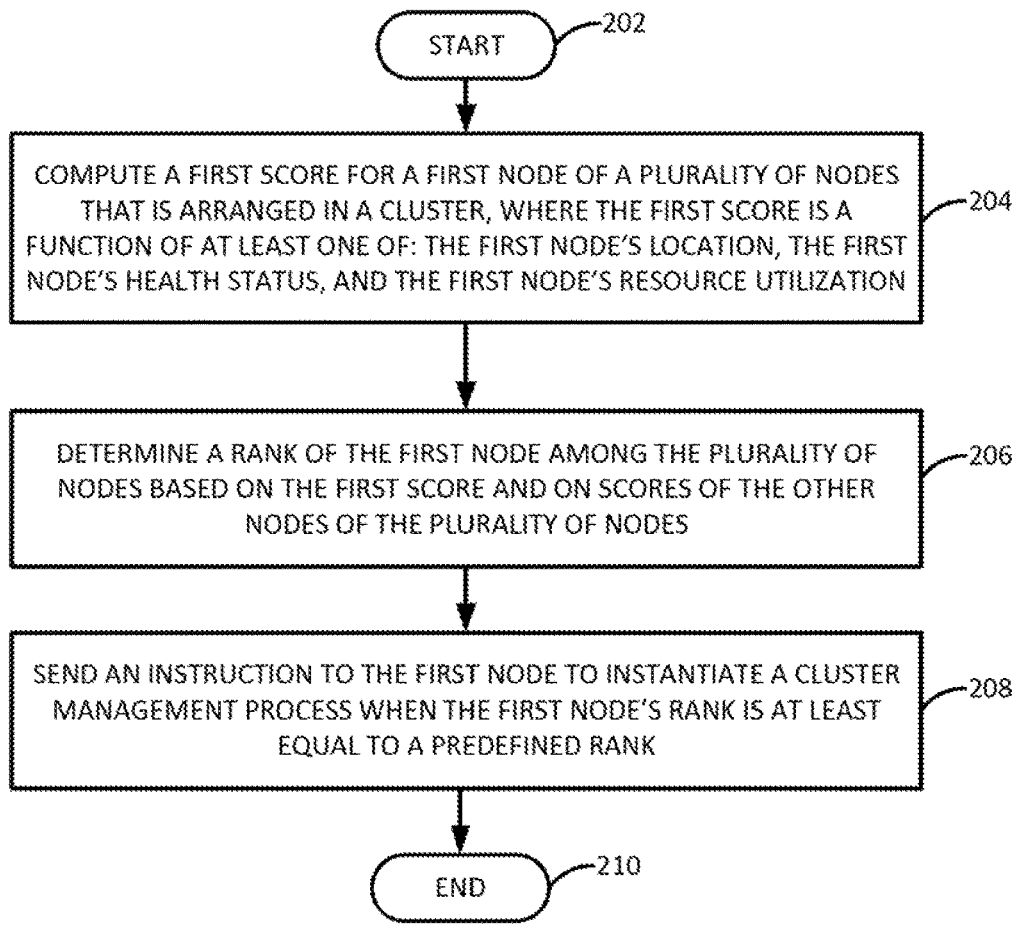
FIG. 2 illustrates a flowchart of an example method for selecting managing nodes for a cluster.

FIG. 2 illustrates a flowchart of an example method 200 for selecting managing nodes for a cluster. The method 200 may be performed, for example, by any of the managing nodes $102_1$, $102_2$, or $102_m$ illustrated in FIG. 1 or by the computer 400 illustrated in FIG. 4. As such, reference may be made in the discussion of the method 200 to various components of the system 100 to facilitate understanding. However, such reference is not intended to limit the method 200 to implementation with the system illustrated in FIG. 1.

The method 200 begins in block 202. In block 204, a first score is computed for a first node of a plurality of nodes that is arranged in a cluster. In one example, the first score comprises a function of a plurality of attributes of the first node. In one example, the plurality of attributes includes at least: a geographic location of the first node (e.g., site, data center zone, rack, etc.), the health of the first node (e.g., stability), and the resource utilization (e.g., memory utilization, CPU utilization, disk utilization, bandwidth utilization, etc.) of the first node. In one example, the first score is computed as a Euclidean distance to an ideal node. For instance, the first score may be computed as the square root of EQN. 1. Scores for the other nodes of the plurality of nodes may be computed in a similar manner. In one example, the first score is computed in response to the passage of a predefined period of time (e.g., calculate the score every y minutes), on-demand, or in response to the occurrence of a predefined event (e.g., restart of the cluster, departure of a managing node from the cluster, addition of new node to the cluster, node failure is predicted in the cluster, a new virtual machine (VM) is created, etc.).

In another example, the first node (and all other nodes in the cluster) may compute its score autonomously. In this case, block 204 may involve retrieving the first score that is computed by the first node, rather than actually computing the first score.

In block 206, a rank of the first node among the plurality of nodes is determined, based on the first score and on the scores of the other nodes of the plurality of nodes. For instance, the plurality of nodes may be sorted in order according to score (e.g., in order of ascending score, descending score, or another order).

In block 208, an instruction is sent to the first node to instantiate a cluster management process at the first node when the first node's rank, as determined in block 206, is at least equal to a predefined rank. For instance, the predefined rank may comprise a cutoff, where the nodes whose ranks fall above the cutoff are sent the instruction to instantiate the cluster management process, and the nodes whose ranks fall below the cutoff are not sent the instruction (or are sent an instruction to de-instantiate the cluster management process, if they were instructed to instantiate it upon a previous iteration of the method 200). In one example, the cutoff results in the n highest ranked nodes being sent the instruction to instantiate the cluster management process.

Thus, the instruction effectively selects the first node as a managing node for the cluster. The cluster management process that is instantiated on the first node in response to the instruction performs operations related to cluster management. For instance, the cluster management process may be responsible for voting to commit state changes to the data stored in the cluster. In one example, the cluster management process also selects managing nodes for the cluster in a manner similar to the manner in which the first node was selected.

The method 200 ends in block 210.

Thus, a managing node in the cluster may select one or more new managing nodes for the cluster as the membership in the cluster changes, and conditions in the cluster change, and as the attributes of the nodes that form the cluster change. Any newly selected managing nodes become, in turn, responsible for selecting one or more new managing nodes upon the next iteration of the method 200. By basing the selection of managing nodes on a score that is a function of node attributes such as location, health, resource utilization, and the like, the nodes that are best suited to manage the cluster (e.g., most likely to increase the likelihood of maintaining the quorum and thus increase the likelihood of maintaining data availability) can be selected in an intelligent manner.

It should be noted that, upon selecting one or more other nodes to function as a managing node, the managing node that made the selection may effectively deselect itself. That is, the number of managing nodes may remain constant, even though the identities of the managing nodes may change over time. Thus, if at least n other nodes are ranked more highly than a current managing node, the current managing node may cease to function as a managing node once the cluster management process is instantiated on the other nodes.

Figure 3:
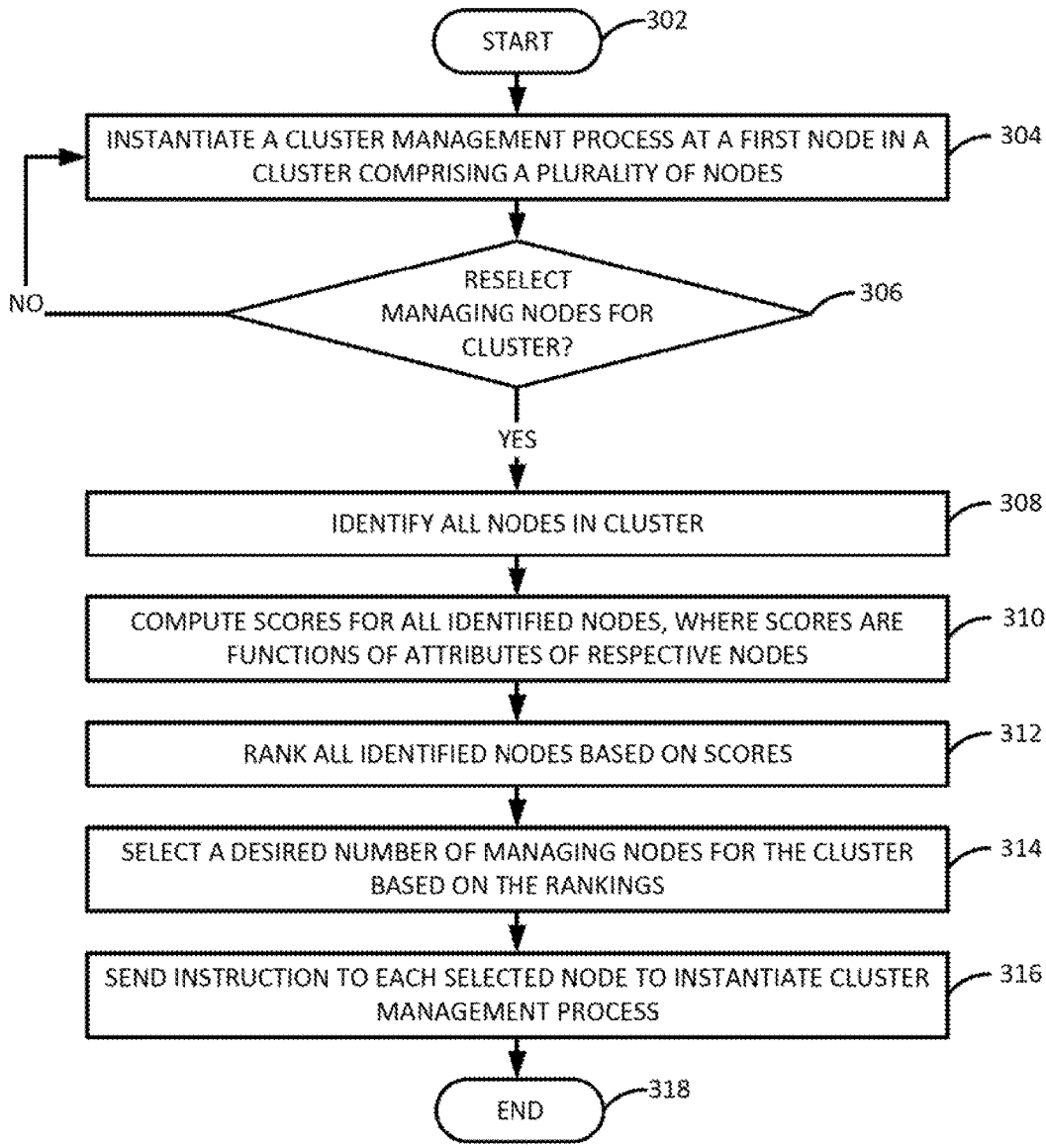
FIG. 3 illustrates a flowchart of another example method for selecting managing nodes for a cluster.

FIG. 3 illustrates a flowchart of another example method 300 for selecting managing nodes for a cluster. The method 300 may be performed, for example, by any of the managing nodes $102_1$, $102_2$, or $102_m$ illustrated in FIG. 1 or by the computer 400 illustrated in FIG. 4. As such, reference may be made in the discussion of the method 300 to various components of the system 100 to facilitate understanding. However, such reference is not intended to limit the method 300 to implementation with the system illustrated in FIG. 1.

The method 300 begins in block 302. In block 304, a cluster management process is instantiated at a first node in a cluster comprising a plurality of nodes. As discussed above, the cluster management process may be responsible for performing various operations related to managing the cluster, including voting to commit state changes to data stored in the cluster and selecting managing nodes for the cluster (i.e., nodes on which to instantiate the cluster management process). Instantiation of the cluster management process on the first node makes the first node a managing node for the cluster. The instantiation of the cluster management process on the first node may occur in response to the initial launch of the cluster or in response to an existing managing node selecting the first node as a new managing node some time after the initial launch of the cluster.

In block 306, it is determined whether the managing nodes for the cluster should be re-selected. In one example, re-selection of the managing nodes may occur periodically, on-demand, or may be triggered some predefined event (e.g., restart of the cluster, departure of an existing managing node from the cluster, addition of new node to the cluster, node failure is predicted in the cluster, a new virtual machine (VM) is created, etc.). If it is determined in block 306 that that the managing nodes should not be re-selected, then the method 300 loops back to block 306 until such time as it is determined that the managing nodes should be re-selected.

Once it is determined in block 306 that the managing nodes should be re-selected, the method 300 proceeds to block 308. In block 308, all nodes in the cluster are identified. The nodes of the cluster may reside at a single site or may be geographically distributed across multiple sites. Each site may include one or more racks across which its nodes are distributed. Thus, for a multisite cluster, all sites may be identified, all racks for each site may be identified, and all nodes for each rack may be identified. For a single site cluster, all racks may be identified, and all nodes for each rack may be identified.

In block 310, scores are computed for all of the nodes identified in block 308. As discussed above, the score may be, for each node, a function of that node's attributes, including geographic location (e.g., site, data center zone, rack, etc.), health (e.g., stability), or resource utilization (e.g., memory utilization, central processing unit (CPU) utilization, disk utilization, bandwidth utilization, etc.). The score may be computed, using these attributes, as a Euclidean distance to an "ideal" node. For instance, in one example the score is computed as the square root of EQN. 1. In some implementations, blocks 308 and 310 of the method 300 may collectively be used to perform the computing of block 204 of the method 200.

In another example, the nodes may compute their scores autonomously. In this case, block 310 may involve retrieving the scores that are computed by the nodes, rather than actually computing the score.

In block 312, the nodes of the cluster are ranked based on the scores computed (or retrieved) in block 310. For instance, the nodes may be sorted in order according to score (e.g., in order of ascending score, descending score, or another order). For instance, if the scores represent Euclidean distances to an ideal node, then the nodes may be ranked in order of ascending score, where a lower score indicates that a corresponding node is "closer" to the ideal node (and, thus, lower scores are ranked more highly than higher scores).

In block 314, a desired number n of managing nodes is selected for the cluster based on the rankings. In one example, the desired number n of managing nodes is an odd number, so as to avoid voting to a tie in the event of the cluster being partitioned or failure of a managing node. Thus, in one example, n is determined in accordance with EQN. 2. The desired number n of managing nodes for a cluster may change over time as the topology of the cluster changes (e.g., due to existing nodes leave the cluster and/or new nodes join the cluster, due to the cluster being partitioned, etc.).

In one example, the n selected nodes may comprise the n most highly ranked nodes (e.g., the n nodes that are closest to the ideal node). In another example, replica nodes are first selected for inclusion in the set of managing nodes. Then, if the set of managing nodes does not yet total n nodes, an additional number of the most highly ranked nodes may be selected until the set of managing nodes total n nodes. However, replica nodes may be given a greater number of votes for the purposes of voting to commit state changes than non-replica nodes.

In another example, if the cluster comprises two nodes or less, then one or more arbiters may be selected as managing nodes (in addition to one or more of the nodes). In this case, the arbiters are "dummy" nodes may serve no other function but to run the cluster management process (and thus establish a quorum on the cluster). However, in some cases, the arbiters may serve additional functions.

In another example, where the nodes are distributed across multiple sites, an equal number of managing nodes may be selected on each of the sites. In addition, one or more arbiters may be selected as managing nodes as well. For instance, if the nodes are distributed across two sites, a third site may be created with an arbiter to act as a tie-breaker (e.g., since the two sites across which the nodes are distributed will contain an equal number of managing nodes). In another example, where the nodes are distributed across multiple racks, at least one node (e.g., the highest ranking node) from each rack is selected as a managing node.

In some implementations, blocks 312 and 314 of the method 300 may collectively be used to perform the ranking of block 206 of the method 200.

Once the desired number n of managing nodes is selected, the method 300 proceeds to block 316. In block 316, an instruction is sent to each managing node selected in block 314 to instantiate a cluster management process. As discussed above, the cluster management process performs operations related management of the cluster. For instance, the cluster management process may be responsible for voting to commit state changes to the data stored in the cluster. In one example, the cluster management process also selects managing nodes for the cluster, e.g., in accordance with the method 300. It should be noted that if the first node on which the method 300 is running is one of the nodes selected in block 314, then the first node may simply continue to run the cluster management process. If, however, the first node is not one of the nodes selected in block 314, then the first node may disable or shut down the cluster management process locally. Thus, block 316 of the method 300 may be similar to block 208 of the method 200.

The method 300 ends in block 318. A new iteration of the method 300 may restart on the nodes that were selected in the just concluded iteration of the method 300 as managing nodes.

It should be noted that although not explicitly specified, some of the blocks, functions, or operations of the methods 200 and 300 described above may include storing, displaying and/or outputting for a particular application. In other words, any data, records, fields, and/or intermediate results discussed in the method can be stored, displayed, and/or outputted to another device depending on the particular application. Furthermore, blocks, functions, or operations in FIGS. 2 and 3 that recite a determining operation, or involve a decision, do not necessarily imply that both branches of the determining operation are practiced. Moreover, blocks, functions, or operations of the above described method(s) can be combined, separated, and/or performed in a different order from that described above, without departing from the examples of the present disclosure.

Figure 4:
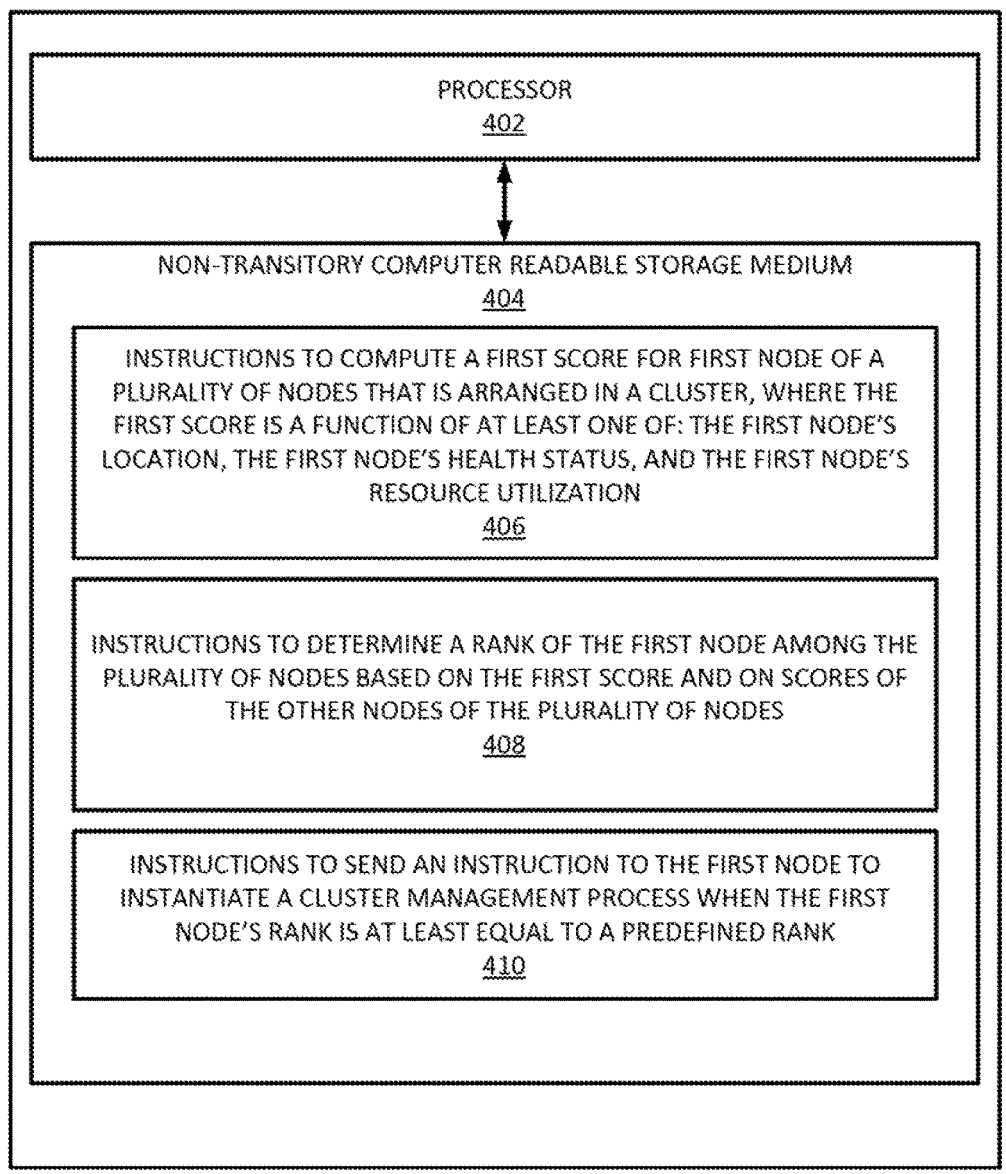
FIG. 4 depicts a high-level block diagram of an example computer that can be transformed into a machine capable of performing the functions described herein.

FIG. 4 depicts a high-level block diagram of an example computer 400 that can be transformed into a machine capable of performing the functions described herein. In one example, the computer 400 may be a managing node such as one of the managing nodes $102_1$, $102_2$, or $102_m$ illustrated in FIG. 1. In one example, the computer 400 may include a processor 402 and a non-transitory machine-readable storage medium 404.

The processor 402 may comprise a microcontroller, a microprocessor, a central processing unit (CPU) core, an application-specific integrated circuit (ASIC), a field programmable gate array (FPGA), or the like.

The non-transitory machine-readable storage medium 404 may include instructions 406, 408, and 410 that, when executed by the processor 402, cause the processor 402 to perform various functions. Example non-transitory machine-readable media include random access memory (RAM), read-only memory (ROM), electrically erasable programmable read-only memory (EEPROM), flash memory, a hard disk drive, or the like. The term "non-transitory" does not encompass transitory propagating signals; nor is it intended to imply that the machine-readable storage medium cannot be altered or changed (e.g., due to a natural degradation of the machine-readable storage medium over time).

The instructions 406 may include instructions to compute a first score for a first node of a plurality of nodes. As discussed above, the first score may comprise a function of a plurality of attributes of the first node. In one example, the plurality of attributes includes at least: a geographic location of the first node (e.g., site, data center zone, rack, etc.), the health of the first node (e.g., stability), and the resource utilization (e.g., memory utilization, CPU utilization, disk utilization, bandwidth utilization, etc.) of the first node. In one example, the first score is computed as a Euclidean distance to an ideal node. For instance, the first score may be computed as the square root of EQN. 1.

The instructions 408 may include instructions to determine a rank of the first node among the plurality of nodes, in accordance with the first score and scores of the other nodes of the plurality of nodes (which are assumed to have been computed in a manner similar to the first score).

The instructions 410 may include instructions to send an instruction to the first node to instantiate a cluster management process when the first node's rank is at least equal to a predefined rank. As discussed above, the predefined rank may comprise a cutoff, where the nodes whose ranks fall above the cutoff are sent the instruction to instantiate the cluster management process, and the nodes whose ranks fall below the cutoff are not sent the instruction (or are sent an instruction to de-instantiate the cluster management process). In one example, the cutoff results in the n highest ranked nodes being sent the instruction to instantiate the cluster management process.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:
1. A system, comprising:
a first group comprising a plurality of nodes of a cluster, wherein each node in the first group runs a cluster management process that votes to commit state changes to data stored in the cluster and that selects nodes for membership in the first group based on a score comprising a function of node location, node health status, and node resource utilization; and
a second group having non-overlapping membership with the first group and comprising a node of the cluster, wherein each node in the second group participates in the cluster without running the cluster management process.
2. The system of claim 1, wherein the first group comprises an odd number of nodes.
3. The system of claim 2, wherein a number of the plurality of nodes is calculated as

$$\frac{\text{total number of nodes in cluster}}{2} + 1.$$

4. The system of claim 1, wherein the score comprises a Euclidean distance from an ideal node.

5. The system of claim 1, wherein the first group includes at least one replica.

6. A method, comprising:
computing, by a processor, for a first node in a distributed storage system comprising a plurality of nodes, a score, wherein the score comprises a function of at least one of: a location of the first node, a health status of the first node, and a resource utilization of the first node;
determining, by the processor, a rank of the first node among the plurality of nodes, based on the score and on a plurality of scores associated with the plurality of nodes; and
sending, by the processor, an instruction to the first node to instantiate a manager process for managing the distributed storage system on the first node when the rank is at least equal to a predefined rank.

7. The method of claim 6, wherein the score comprises a Euclidean distance from an ideal node.

8. The method of claim 6, wherein the location of the first node identifies a rack on which the first node is located.

9. The method of claim 8, wherein the location of the first node further identifies a site at which the first node is located.

10. The method of claim 6, wherein the health status of the first node comprises a stability of the first node.

11. The method of claim 6, wherein the health status of the first node comprises a self monitoring, analysis, and reporting technology status of the first node.

12. The method of claim 6, wherein the resource utilization of the first node comprises a memory utilization.

13. The method of claim 6, wherein the resource utilization of the first node comprises a central processing unit utilization.

14. The method of claim 6, wherein the resource utilization of the first node comprises a disk utilization.

15. The method of claim 6, wherein the score further comprises a function of a network bandwidth of the first node.

16. The method of claim 6, further comprising:
prior to sending the instruction, determining, by the processor, a number of the plurality of nodes to which to send the instruction.

17. The method of claim 6, wherein the number comprises an odd number.

18. The method of claim 17, wherein the number is calculated as $$\frac{\text{total number of nodes in cluster}}{2} + 1.$$

19. A non-transitory machine-readable storage medium encoded with instructions executable by a processor, the machine-readable storage medium comprising:
instructions to compute, for a first node in a distributed storage system comprising a plurality of nodes, a score, wherein the score comprises a function of at least one of: a location of the first node, a health status of the first node, and a resource utilization of the first node;
instructions to determine a rank of the first node among the plurality of nodes, based on the score and on a plurality of scores associated with the plurality of nodes; and
instructions to send an instruction to the first node to instantiate a manager process for managing the distributed storage system on the first node when the rank is at least equal to a predefined rank.

20. The non-transitory machine-readable storage medium of claim 19, wherein the score comprises a Euclidean distance from an ideal node.

* * * * *